US012424145B2

(12) United States Patent
Chang et al.

(10) Patent No.: US 12,424,145 B2
(45) Date of Patent: Sep. 23, 2025

(54) OLED DISPLAY DRIVER INTEGRATED CIRCUIT AND DISPLAY DRIVING METHOD

(71) Applicant: Novatek Microelectronics Corp., Hsinchu (TW)

(72) Inventors: Hsiang-Sheng Chang, Hsinchu County (TW); Yao-Min Chou, Hsinchu (TW); Shuo-Wen Jang, Hsinchu (TW); Shin-Hong Wu, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/592,446

(22) Filed: Feb. 29, 2024

(65) Prior Publication Data

US 2025/0279032 A1 Sep. 4, 2025

(51) Int. Cl.
*G09G 3/20* (2006.01)
*G09G 3/3225* (2016.01)

(52) U.S. Cl.
CPC ......... *G09G 3/2096* (2013.01); *G09G 3/3225* (2013.01); *G09G 2300/0861* (2013.01); *G09G 2320/0247* (2013.01)

(58) Field of Classification Search
None
See application file for complete search history.

(56) References Cited

U.S. PATENT DOCUMENTS 7,551,166 B2 6/2009 Endo
8,134,550 B2 * 3/2012 Kim ....................... G09G 5/399 345/530
11,170,730 B2 11/2021 Kim et al.
11,676,557 B2 * 6/2023 Park ......................... G09G 5/12 345/1.1
2003/0178951 A1 9/2003 Park et al.
2004/0227764 A1 11/2004 Endo
(Continued)

FOREIGN PATENT DOCUMENTS

CN 100416628 C * 9/2008 ............. G09G 3/325
TW 200428319 12/2004
TW 202008770 2/2020

OTHER PUBLICATIONS

"Office Action of Taiwan Counterpart Application", issued on Feb. 17, 2025, p. 1-p. 3.

*Primary Examiner* — Duane N Taylor, Jr.
(74) *Attorney, Agent, or Firm* — JCIPRNET

(57) ABSTRACT

An OLED display driver integrated circuit and a display driving method are provided. The OLED display driver integrated circuit includes a timing control circuit. The timing control circuit is configured to receive an external vertical synchronization signal. The timing control circuit generates an internal vertical synchronization signal, and generates a first switching signal and a second switching signal according to the internal vertical synchronization signal. The timing control circuit determines whether to adjust a time point of a next pulse of the internal vertical synchronization signal according to a time point of the latest received pulse of the external vertical synchronization signal. The first switching signal and the second switching signal are output to an OLED display panel and utilized for controlling an emission control circuit disposed in the OLED display panel which is utilized for controlling an illuminating period of pixel units of the OLED display panel.

14 Claims, 7 Drawing Sheets

(56) References Cited

U.S. PATENT DOCUMENTS

| | | | | |
|---|---|---|---|---|
| 2008/0055289 | A1* | 3/2008 | Kim | G09G 5/399<br>345/82 |
| 2020/0035188 | A1 | 1/2020 | Kim et al. | |
| 2021/0201733 | A1 | 7/2021 | Lee et al. | |
| 2021/0233969 | A1* | 7/2021 | Sun | H10K 59/122 |
| 2022/0343877 | A1* | 10/2022 | Park | G09G 5/12 |
| 2023/0316993 | A1 | 10/2023 | Kim et al. | |
| 2024/0021129 | A1 | 1/2024 | Kim et al. | |
| 2024/0046885 | A1* | 2/2024 | Cheon | G09G 3/2096 |
| 2024/0049370 | A1* | 2/2024 | Kim | H05B 45/347 |

* cited by examiner

OLED DISPLAY DRIVER INTEGRATED CIRCUIT AND DISPLAY DRIVING METHOD

BACKGROUND

Technical Field

The disclosure relates an integrated circuit; particularly, the disclosure relates to an OLED display driver integrated circuit and a display driving method.

Description of Related Art

In order to provide users with a better experience, a display device may use different refresh rates corresponding to different usage scenarios. For example, when the display device displays games, the display device may operate at a high refresh rate to make gaming images being displayed smoother. Or, when the display device displays for web browsing or reading, the display device may operate at a low refresh rate to reduce power consumption. In this regard, when the display device is switching between different usage scenarios, the traditional display driver integrated chip cannot predict in time what refresh rate the display device switches to and may result in screen flicker. When the refresh rate change occurs in an organic light emitting diode (OLED) display device, the emission signal that controls emission of OLED pixels may not be able to present a complete timing sequence. Moreover, if the duty cycle of the emission signal changes, it will change the OLED display brightness, causing the user to see the screen flickering.

SUMMARY

The organic light emitting diode (OLED) display driver integrated circuit of the disclosure includes a timing control circuit. The timing control circuit is configured to receive an external vertical synchronization signal. The timing control circuit generates an internal vertical synchronization signal, and generates a first switching signal and a second switching signal according to the internal vertical synchronization signal. The timing control circuit determines whether to adjust a time point of a next pulse of the internal vertical synchronization signal according to a time point of the latest received pulse of the external vertical synchronization signal. The first switching signal and the second switching signal are output to an OLED display panel and utilized for controlling an emission control circuit disposed in the OLED display panel which is utilized for controlling an illuminating period of pixel units of the OLED display panel.

The display driving method for an organic light emitting diode (OLED) display driver integrated circuit of the disclosure includes the following steps: receiving an external vertical synchronization signal and generating an internal vertical synchronization signal by a timing control circuit in the OLED display driver integrated circuit; generating a first switching signal and a second switching signal according to the internal vertical synchronization signal by the timing control circuit; determining whether to adjust a time point of a next pulse of the internal vertical synchronization signal according to a time point of the latest received pulse of the external vertical synchronization signal by the timing control circuit; and outputting the first switching signal and the second switching signal to an OLED display panel to control an emission control circuit disposed in the OLED display panel which is utilized for controlling an illuminating period of pixel units of the OLED display panel.

Based on the above, according to the OLED display driver integrated circuit and the display driving method of the disclosure, the OLED display driver integrated circuit may effectively drive the OLED display panel to achieve good display effects.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
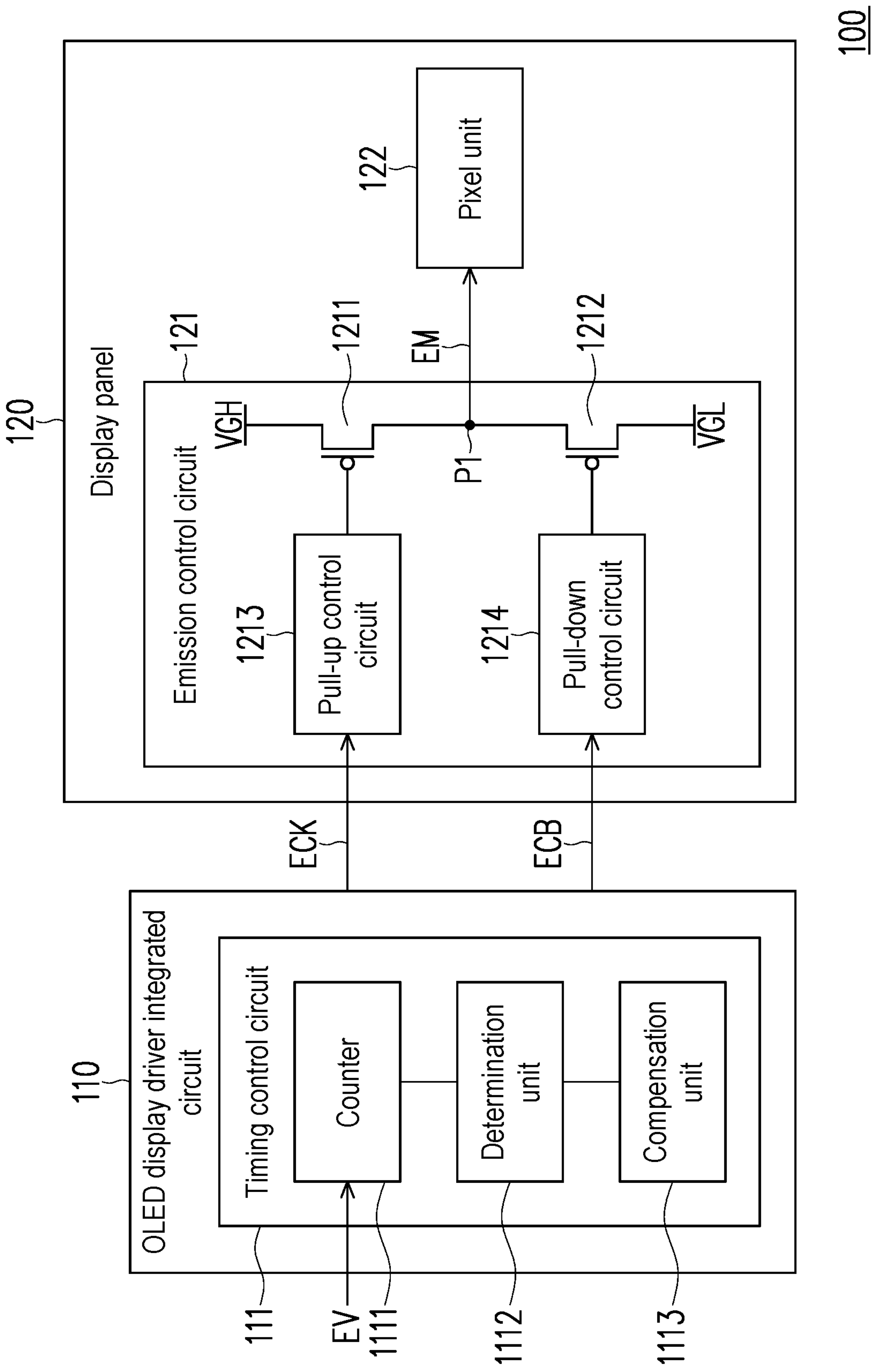
FIG. 1 is a circuit schematic diagram of an electronic device according to an embodiment of the disclosure.

Reference is now made in detail to exemplary embodiments of the disclosure, and examples of the exemplary embodiments are illustrated in the accompanying drawings. Wherever possible, the same reference numerals are used in the drawings and descriptions to refer to the same or similar parts.

FIG. 1 is a circuit schematic diagram of an electronic device according to an embodiment of the disclosure. Referring to FIG. 1, an electronic device 100 includes an OLED display driver integrated circuit 110 and an OLED display panel 120, such as a mobile phone, tablet or notebook computer. The OLED display driver integrated circuit 110 includes a timing control circuit 111. The timing control circuit 111 includes a counter 1111, a determination unit 1112, and a compensation unit 1113. The determination unit 1112 is coupled to the counter 1111 and the compensation unit 1113. The OLED display panel 120 includes an emission control circuit 121 and a plurality of pixel units, and only a pixel unit 122 is shown in FIG. 1 for the illustrative purpose. The emission control circuit 121 includes a pull-up transistor 1211, a pull-down transistor 1212, a pull-up control circuit 1213, and a pull-down control circuit 1214. The pull-up transistor 1211 and the pull-down transistor 1212 may be p-type transistors, but the disclosure in not limited thereto. The pull-up control circuit 1213 is coupled to the OLED display driver integrated circuit 110 and a control terminal of the pull-up transistor 1211. The pull-down control circuit 1214 is coupled to the OLED display driver integrated circuit 110 and a control terminal of the pull-down transistor 1212. A first terminal of the pull-up transistor 1211 is coupled to a first reference voltage VGH of a high voltage level. A second terminal of the pull-up transistor 1211 is coupled to an output node (circuit node) P1. A first terminal of the pull-down transistor 1212 is coupled to the output node P1. A second terminal of the pull-down transistor 1212 is coupled to a second reference voltage VGL of a low voltage level. The output node P1 is further coupled to the pixel unit 122.

In the embodiment of the disclosure, the electronic device 100 may be a display device. The OLED display panel 120 may include a pixel array having a plurality of pixels, and each of the plurality of pixels may implement as the pixel unit 122. The pixel unit 122 may be a subpixel. In the embodiment of the disclosure, the OLED display driver integrated circuit 110 may receive an external vertical synchronization signal EV, and output a first switching signal ECK and a second switching signal ECB to the emission control circuit 121 according to the external vertical synchronization signal EV. The emission control circuit 121 may output an emission signal EM to the pixel unit 122 according to the first switching signal ECK and the second switching signal ECB, to drive the pixel unit 122.

Figure 2:
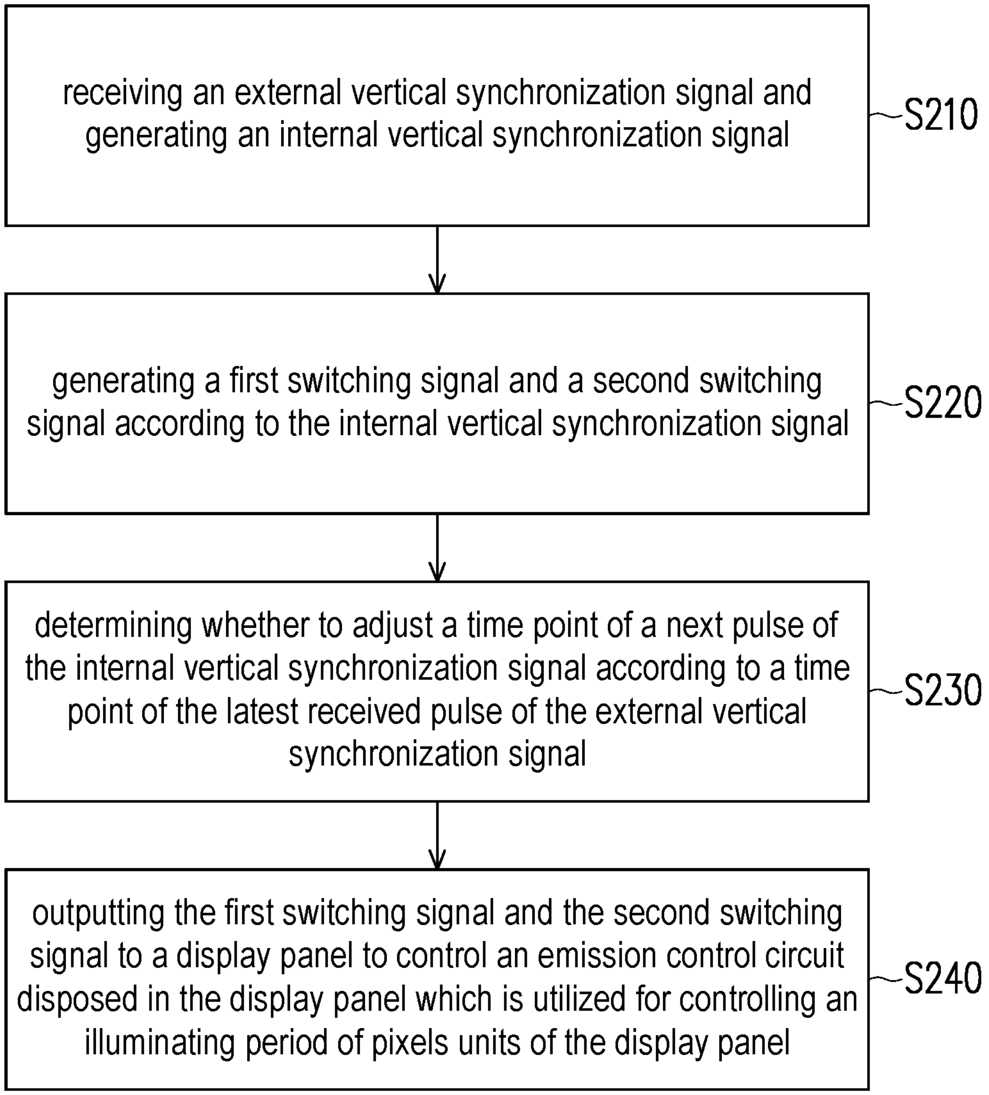
FIG. 2 is a flowchart of a display driving method according to an embodiment of the disclosure.

FIG. 2 is a flowchart of a display driving method according to an embodiment of the disclosure. Referring to FIG. 1 and FIG. 2, the electronic device 100 may perform the following steps S210 to S240. In step S210, the timing control circuit 111 may receive the external vertical synchronization signal EV, and generate an internal vertical synchronization signal. In step S220, the timing control circuit 111 may generate the first switching signal ECK and the second switching signal ECB according to the internal vertical synchronization signal. In step S230, the determination unit 1112 may determine whether to adjust a time point of a next pulse of the internal vertical synchronization signal according to a time point of the latest received pulse of the external vertical synchronization signal. In step S240, the timing control circuit 111 may output the first switching signal ECK and the second switching signal ECB to the OLED display panel 120 to control the emission control circuit 121 disposed in the OLED display panel 120 which is utilized for controlling an illuminating period of pixel unit 122 of the OLED display panel 120.

In the embodiment of the disclosure, the pull-up control circuit 1213 may receive the first switching signal ECK, and switch the pull-up transistor 1211 according to the first switching signal ECK. The pull-down control circuit 1214 may receive the second switching signal ECB, and switch the pull-down transistor 1212 according to the second switching signal ECB. Thus, the first reference voltage VGH of the high voltage level and the second reference voltage VGH of the low voltage level may be alternately output to the output node N1, to form the emission signal EM to drive the pixel unit 122.

In the embodiment of the disclosure, when the frequency of the external vertical synchronization signal EV changes, whatever due to refresh rate of the OLED display panel changes or other conditions, the compensation unit 1113 may compensate the time period of the internal vertical synchronization signal. Therefore, the pull-up control circuit 1213 and the pull-down control circuit 1214 may be ensured to be operated correctly, and the duty cycle of the emission signal EM may be maintained, thereby effectively preventing screen flicker from occurring in the pixel unit 122.

Figure 3:
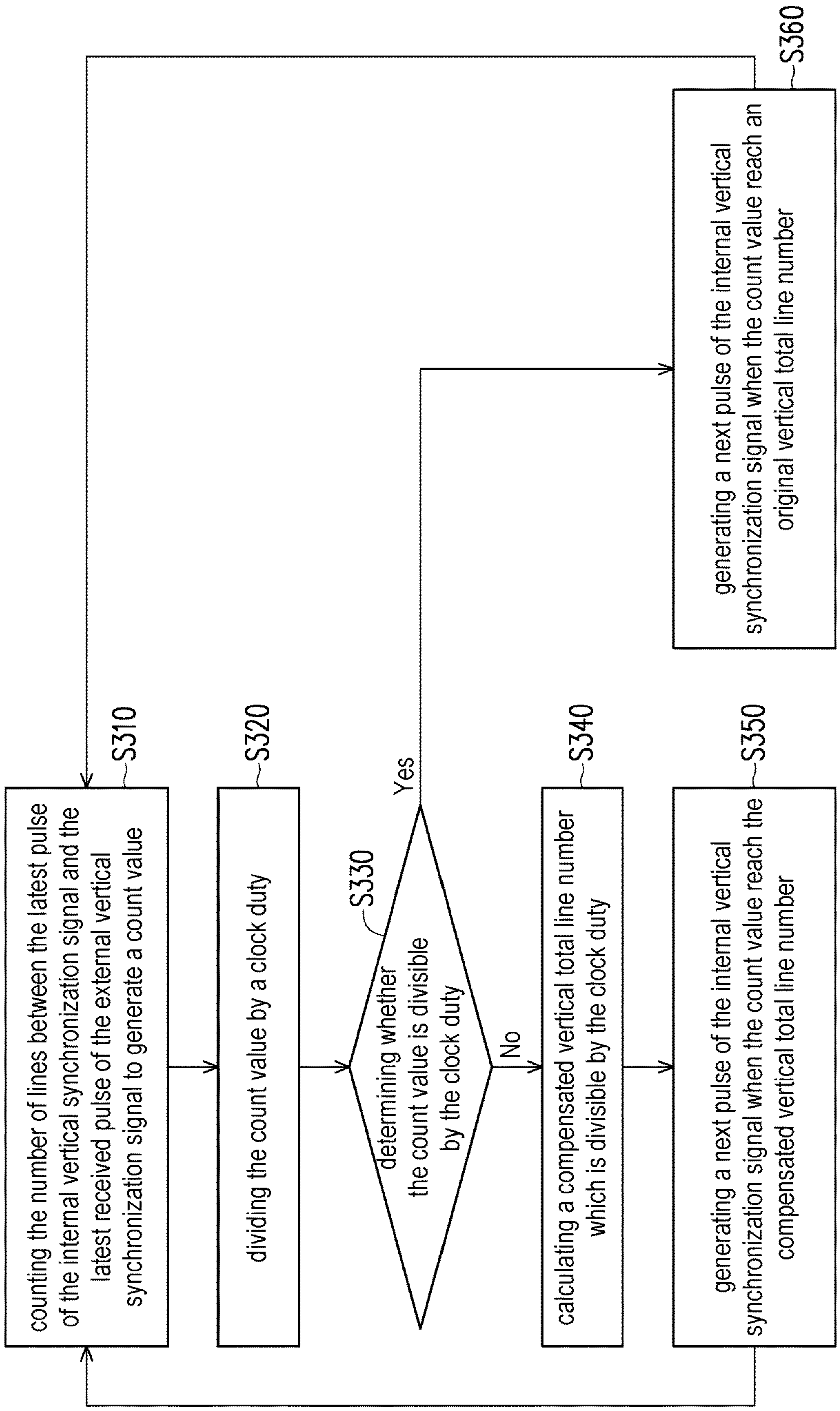
FIG. 3 is a flowchart of a display driving method according to an embodiment of the disclosure.

FIG. 3 is a flowchart of a display driving method according to an embodiment of the disclosure. The specific implementation of the step S230 of the embodiment of FIG. 2 may be the following steps S310 to S360. Referring to the FIG. 1 and FIG. 3, the timing control circuit 111 may perform the following steps S310 to S360. In step S310, the counter 1111 may counting the number of lines between a latest pulse of the internal vertical synchronization signal and the latest received pulse of the external vertical synchronization signal to generate a count value (i.e. counting a number of clock pulses of a clock signal). In step S320, the determination unit 1112 may divide the count value by a clock duty. In step S330, the determination unit 1112 may determine whether the count value is divisible by the clock duty. In the embodiment of the disclosure, the clock duty represents a time length and is defined by a preconfigured number of line periods (a.k.a. horizontal line periods), such as eight line periods (usually denoted by 8H). In a condition when the refresh rate does not change, the period of the internal vertical synchronization signal is a multiple of the clock duty, and the period of the first switching signal ECK (same as the period of the second switching signal ECB) is also a multiple of the clock duty.

If the count value is not divisible by the clock duty, which may be resulted from some reasons such as refresh rate change, GPU rendering, and so on. In step S340, the compensation unit 1113 may calculate a compensated vertical total line number which is divisible by the clock duty, which means that the compensated vertical total line number is an integer multiple of the clock duty. It is note that the division operation is Euclidean division or called modulo division in the embodiments of the disclosure. Next, in step S350, the timing control circuit 111 may generate a next pulse of the internal vertical synchronization signal when the count value reaches the compensated vertical total line number. In other words, the next pulse of the internal vertical synchronization signal does not show synchronously when the latest pulse of the external vertical synchronization signal arrives, but shows when a time period determined by the compensated vertical total line number elapses from the timing point of the latest pulse of the internal vertical synchronization signal. After step S350, the timing control circuit 111 may continuously execute step S310.

If the count value is divisible by the clock duty, i.e., the remainder is zero, in step S360, the timing control circuit 111 may generate a next pulse of the internal vertical synchronization signal when the count value reaches an original vertical total line number. The timing control circuit 111 may generate the next pulse of the internal vertical synchronization signal when a time period determined by an original vertical total line number elapses from the timing point of the latest pulse of the internal vertical synchronization signal. Moreover, the timing control circuit 111 may continuously execute step S310.

Therefore, when the frequency of the external vertical synchronization signal EV changes, the timing control circuit 111 may determine whether the count value is divisible by the clock duty, adjust the time point of the next pulse of the internal vertical synchronization signal in response to the count value which is not divisible by the clock duty, and as a result, the period of the first switching signal ECK (same as the period of the second switching signal ECB) may be maintained as the period before the refresh rate changes, so that the duty cycle of the emission signal EM may be maintained, and it can effectively avoid screen flickering. The specific adjustment method of the internal vertical synchronization signal will be described below.

Figure 4:
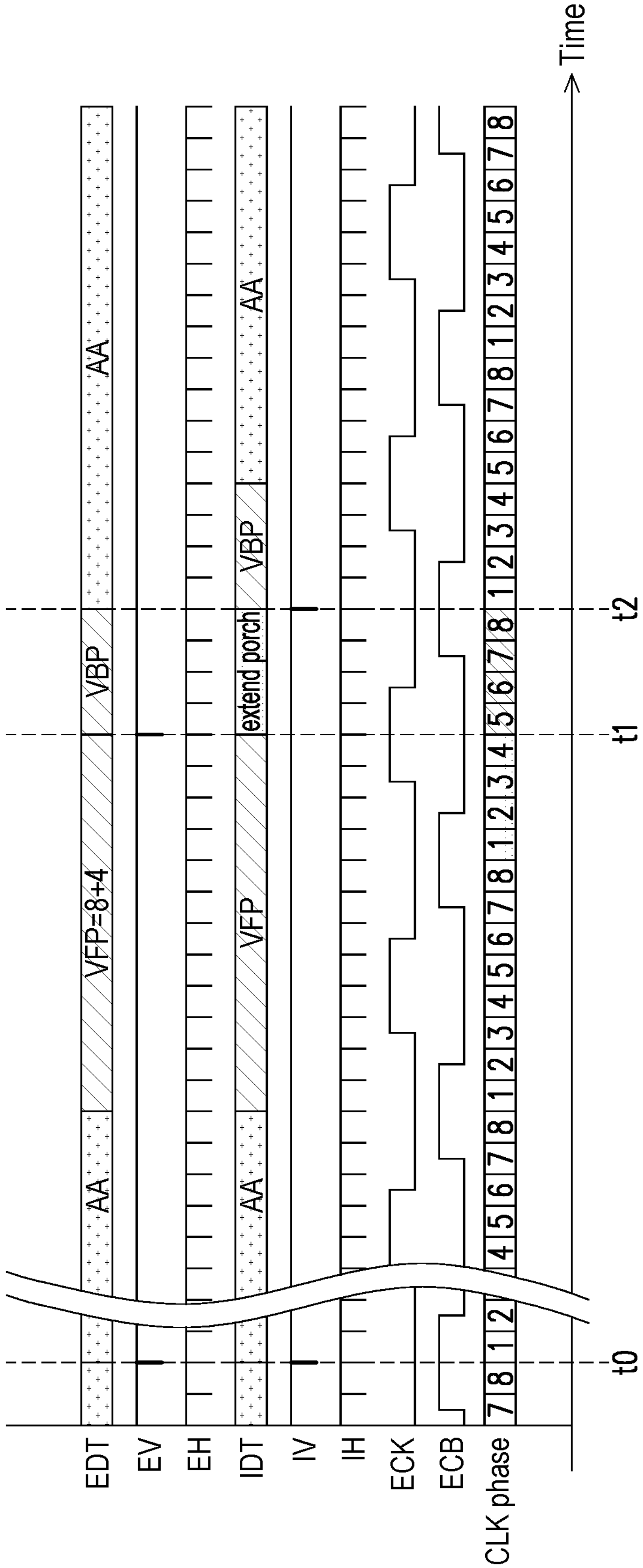
FIG. 4 is a schematic diagram of relevant signals according to an embodiment of the disclosure.

FIG. 4 is a schematic diagram of relevant signals according to an embodiment of the disclosure. FIG. 4 illustrates exemplary timing sequences of an OLED display driver integrated circuit which performs the display driving method of FIG. 3. Referring to FIG. 1 and FIG. 4, the OLED display driver integrated circuit 110 may receive an external vertical synchronization signal EV and an external horizontal synchronization signal EH. The OLED display driver integrated circuit 110 may generate an internal vertical synchronization signal IV and an internal horizontal synchronization signal IH according to the external vertical synchronization signal EV, the external horizontal synchronization signal EH. The time sequence diagrams of FIG. 4 to FIG. 7 further include external display timing sequence EDT and internal display timing sequence IDT, which indicate the time period of display data of active area (denoted by AA) and the time period of porch intervals (denoted by VFP, VBP). The OLED display driver integrated circuit 110 may generate a first switching signal ECK and a second switching signal ECB according to the internal vertical synchronization signal IV. The last row of the time sequence diagrams of FIG. 4-FIG. 7 indicate a clock (CLK) phase sequence, denoted by the first phase to the last phase of one period, which is based on the give clock duty is 8 horizontal line periods (8H) in this example.

In the example of FIG. 4, after the refresh rate changes, the latest pulse of the external vertical synchronization signal EV is received at time point t1, later than the expected time (which is 4 line periods (4H) earlier than t1), and the vertical front porch VFP (as the denoted VFP=8+4) of the external display timing sequence EDT during the current frame period is extended from 8 clock phases to 12 clock phases. The latest pulse of the internal vertical synchronization signal IV showing before the latest pulse of the external vertical synchronization signal EV is at time point t0. In the embodiment of the disclosure, the counter 1111 may count the number of lines (or line periods) between the latest pulse of the internal vertical synchronization signal IV at time point to and the latest received pulse of the external vertical synchronization signal EV at time point t1 to generate a count value, represented by 8*N+4, wherein 8 (line periods) is the given clock duty in this example and N is an integer. Then, the determination unit 1112 may divide the count value by the clock duty. In FIG. 4, the determination unit 1112 determines that the count value is not divisible by the clock duty, therefore the compensation unit 1113 calculates a compensated vertical total line number which is divisible by the clock duty. The compensated vertical total line number relates to a time period from time point t0 to time point t2, which may equal 8*(N+1), an integer multiple of 8. The time period determined by the compensated vertical total line number may equal the count value (i.e. 8*N+4) plus a compensation value, and the compensation value equals the clock duty minus a remainder of the count value divided by the clock duty. In the example of FIG. 4, the remainder of the count value (8*N+4) divided by the clock duty (8) equals 4, and compensation value equals 4.

In the embodiment of FIG. 4 of the disclosure, a vertical front porch VFP of an internal display timing sequence IDT may be extended (by a time length of 4 clock phases) to time point t2. The timing control circuit 111 may generate a next pulse of the internal vertical synchronization signal IV at time point t2 when the time period determined by the compensated vertical total line number elapses from the timing point (t0) of the latest pulse of the internal vertical synchronization signal IV. Therefore, the pull-up control circuit 1213 and the pull-down control circuit 1214 may be ensured to be operated correctly in a next frame period from time point t2, and the duty cycle of the emission signal EM may be maintained, thereby effectively preventing screen flicker.

Figure 5:
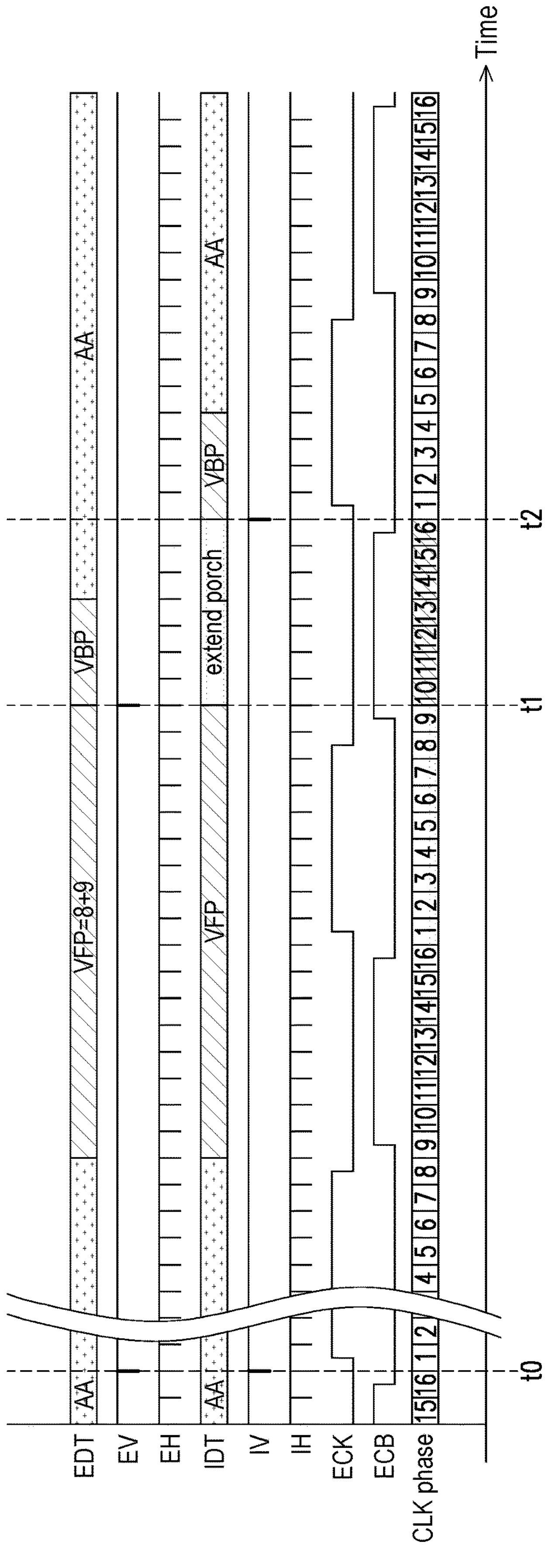
FIG. 5 is a schematic diagram of relevant signals according to an embodiment of the disclosure.

FIG. 5 is a schematic diagram of relevant signals according to an embodiment of the disclosure FIG. 5 illustrates another exemplary timing sequences of an OLED display driver integrated circuit which performs the display driving method of FIG. 3. Referring to FIG. 1 and FIG. 5, in the embodiment of FIG. 5 the disclosure, after the refresh rate changes, the latest pulse of the external vertical synchronization signal EV is received at time point t1, later than the expected time (which is 9 line periods earlier than t1), and the vertical front porch VFP (as the denoted VFP=8+9) of the external display timing sequence EDT during the current frame period is extended from 8 clock phases to 17 clock phases. The latest pulse of the internal vertical synchronization signal IV showing before the latest pulse of the external vertical synchronization signal EV is at time point t0. In the embodiment of the disclosure, the counter 1111 may count the number of lines (or line periods) between the latest pulse of the internal vertical synchronization signal IV at time point t0 and the latest received pulse of the external vertical synchronization signal EV at time point t1 to generate a count value, represented by 16*N+9, wherein 16 (line periods) is the given clock duty in this example and N is an integer. Then, the determination unit 1112 may divide the count value by the clock duty. In the example of FIG. 5, the determination unit 1112 determines that the count value is not divisible by the clock duty, therefore the compensation unit 1113 calculates a compensated vertical total line number which is divisible by the clock duty. The compensated vertical total line number relates to a time period from time point t0 to time point t2, which may equal 16*(N+1), an integer multiple of 16. The time period determined by the compensated vertical total line number may equal the count value (i.e. 16*N+9) plus a compensation value, and the compensation value equals the clock duty minus a remainder of the count value divided by the clock duty. In the example of FIG. 5, the remainder of the count value (16*N+9) divided by the clock duty (16) equals 9, and compensation value equals 7.

In the embodiment of FIG. 5 of the disclosure, a vertical front porch VFP of an internal display timing sequence IDT may be extended (by a time length of 7 clock phases) to time point t2. The timing control circuit 111 may generate a next pulse of the internal vertical synchronization signal IV at time point t2 when the time period determined by the compensated vertical total line number elapses from the timing point (t0) of the latest pulse of the internal vertical synchronization signal IV. Therefore, the pull-up control circuit 1213 and the pull-down control circuit 1214 may be ensured to be operated correctly in a next frame period from time point t2, and the duty cycle of the emission signal EM may be maintained, thereby effectively preventing screen flicker.

Figure 6:
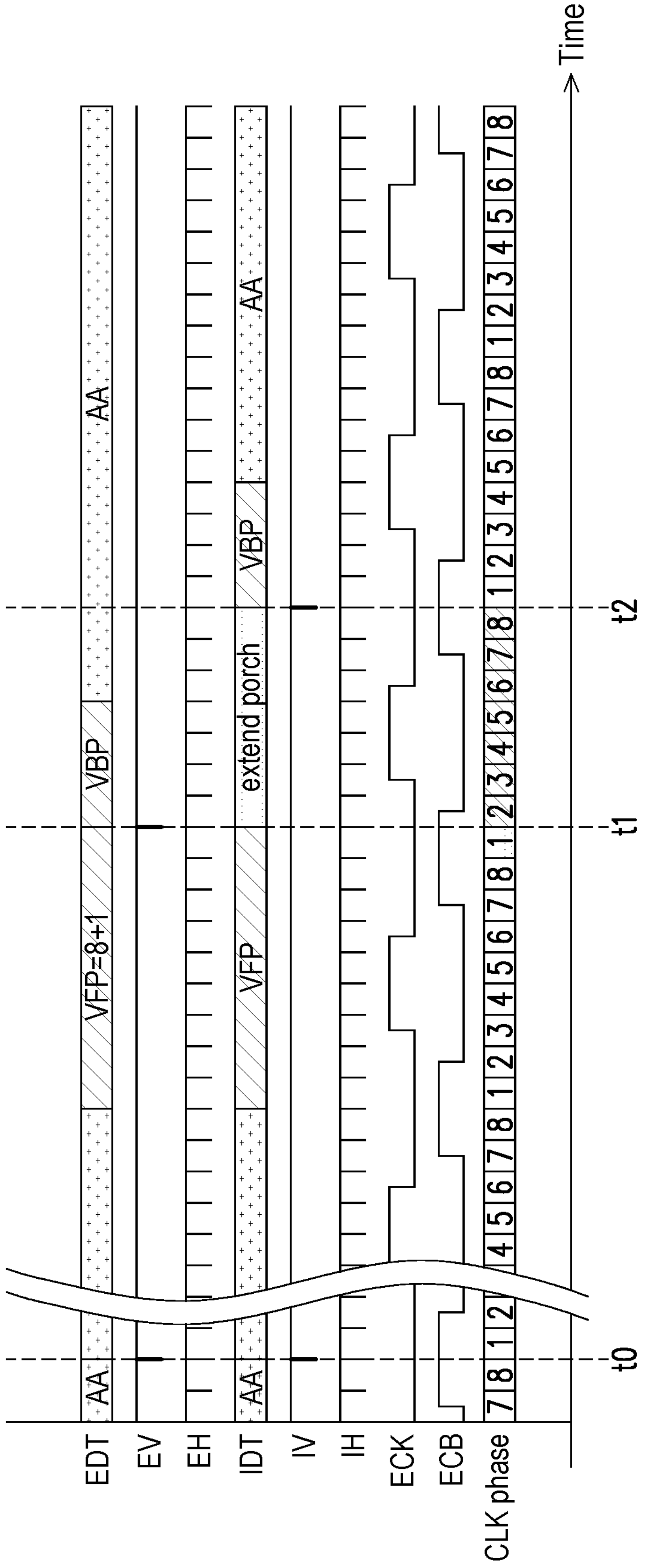
FIG. 6 is a schematic diagram of relevant signals according to an embodiment of the disclosure.

FIG. 6 is a schematic diagram of relevant signals according to an embodiment of the disclosure. FIG. 6 illustrates another exemplary timing sequences of an OLED display driver integrated circuit which performs the display driving method of FIG. 3. Different from the assumed scenarios (refresh rate change) shown in the examples of FIG. 4 and FIG. 5, the latest pulse of the external vertical synchronization signal EV shown in FIG. 6 may delay because the OLED display driver integrated circuit is operated in a video mode and is in graphics processing unit (GPU) rendering. The give clock duty is 8 horizontal line periods (8H). As shown in FIG. 6, due to GPU rendering, the latest pulse of the external vertical synchronization signal EV is received at time point t1, later than the expected time (which is one line period (1H) earlier than t1), and a vertical front porch VFP of a current frame period of an external display timing sequence EDT is extended from 8 clock phases to 9 clock phases. In the embodiment of the disclosure, the counter 1111 may count the number of lines (or line periods) between the latest pulse of the internal vertical synchronization signal IV at time point t0 and the latest received pulse of the external vertical synchronization signal EV at time point t1 to generate a count value represented by 8*N+1, wherein 8 (line periods) is the given clock duty in this example and N is an integer. Then, the determination unit 1112 may divide the count value by the clock duty. In the example of FIG. 6, the determination unit 1112 determines that the count value is not divisible by the clock duty, therefore the compensation unit 1113 may calculate a compensated vertical total line number which is divisible by the clock duty. The compensated vertical total line number relates to a time period from time point t0 to time point t2, which may equal 8*(N+1), an integer multiple of 8. The time period determined by the compensated vertical total line number may equal the count value (i.e. 8*N+1) plus a compensation value, and the compensation value equals the clock duty minus a remainder of the count value divided by the clock duty. In the example of FIG. 6, the remainder of the count value (8*N+1) divided by the clock duty (8) equals 1, and compensation value equals 7.

In the embodiment of FIG. 6 of the disclosure, a vertical front porch VFP of an internal display timing sequence IDT may be extended (by a time length of 7 clock phases) to time point t2. The timing control circuit 111 may generate a next pulse of the internal vertical synchronization signal IV at time point t2when the time period determined by the compensated vertical total line number elapses from the timing point (t0) of the latest pulse of the internal vertical synchronization signal IV. Therefore, the pull-up control circuit 1213 and the pull-down control circuit 1214 may be ensured to be operated correctly in a next frame period from time point t2, and the duty cycle of the emission signal EM may be maintained, thereby effectively preventing screen flicker.

Figure 7:
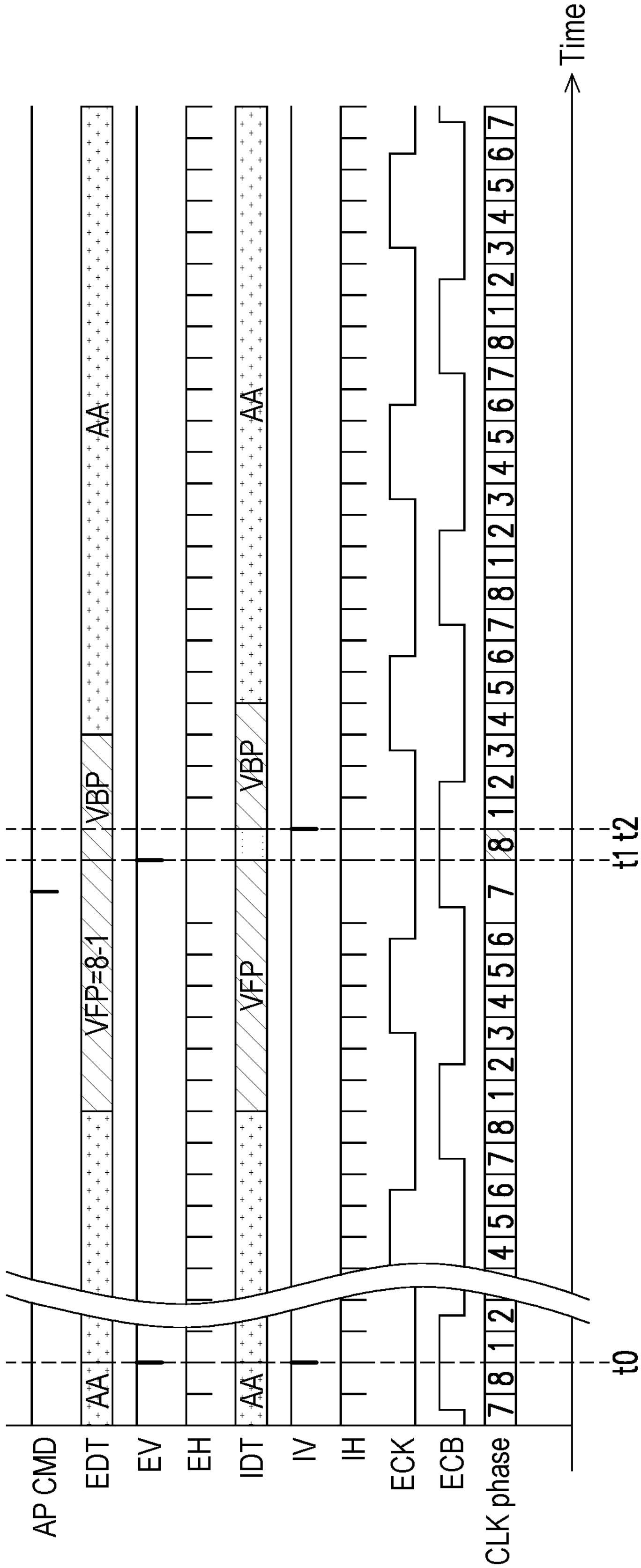
FIG. 7 is a schematic diagram of relevant signals according to an embodiment of the disclosure.

FIG. 7 is a schematic diagram of relevant signals according to an embodiment of the disclosure FIG. 7 illustrates another exemplary timing sequences of an OLED display driver integrated circuit which performs the display driving method of FIG. 3. Different from the assumed scenarios such as refresh rate change and GPU rendering shown in the aforementioned examples, FIG. 7 illustrated a condition when a core processing unit of an electronic device, such as an application processor (AP), transmits a command to the OLED display driver integrated circuit of the electronic device, one or some pulses of the external horizontal synchronization signal EH and the internal horizontal synchronization signal IH may be missing, which may result in that the next pulse of the external vertical synchronization signal EV does not come in a correct timing. As shown in FIG. 7, due to AP transmitting a command (AP CMD), the latest pulse of the external vertical synchronization signal EV is received at time point t1 which the external horizontal synchronization signal EH and the internal horizontal synchronization signal IH do not run a complete clock duty yet.

As shown in FIG. 7, the latest pulse of the external vertical synchronization signal EV is received at time point t1 which is one horizontal period (1H) earlier than it is expected, and a vertical front porch VFP of a current frame period of an external display timing sequence EDT is shortened from 8 clock phases to 7 clock phases. In the embodiment of the disclosure, the counter 1111 may count the number of lines (or line periods) between the latest pulse of the internal vertical synchronization signal IV at time point t0 and the latest received pulse of the external vertical synchronization signal EV at time point t1 to generate a count value, represented by 8*N−1 (or 8*N'+7), wherein 8 (line periods) is the given clock duty in this example and N (or N') is an integer. Then, the determination unit 1112 may divide the count value by the clock duty. The determination unit 1112 determines that the count value is not divisible by the clock duty, therefore the compensation unit 1113 may calculate a compensated vertical total line number which is divisible by the clock duty. The compensated vertical total line number relates to a time period from time point t0 to time point t2, which may equal 8*N or 8*(N'+1), an integer multiple of 8. The time period determined by the compensated vertical total line number may equal the count value plus a compensation value, and the compensation value equals the clock duty minus a remainder of the count value divided by the clock duty. In the example of FIG. 7, the remainder of the count value (8*N−1) divided by the clock duty (8) equals 7, and compensation value equals 1.

In the embodiment of FIG. 7 of the disclosure, a vertical front porch VFP of an internal display timing sequence IDT may be extended (by a time length of 1 clock phase) to time point t2. The timing control circuit 111 may generate a next pulse of the internal vertical synchronization signal IV at time point t2 when the time period determined by the compensated vertical total line number elapses from the timing point (t0) of the latest pulse of the internal vertical synchronization signal IV. Therefore, the pull-up control circuit 1213 and the pull-down control circuit 1214 may be ensured to be operated correctly in a next frame period from time point t2, and the duty cycle of the emission signal EM may be maintained, thereby effectively preventing screen flicker.

In summary, the OLED display driver integrated circuit and the display driving method of the disclosure may automatically determine whether the frequency of the external vertical synchronization signal changes, and may automatically adjust the internal vertical synchronization signal to ensure that the pull-up transistor and the pull-down transistor operate correctly. Thus, the duty cycle of the emission signal may be maintained, thereby effectively preventing screen flicker.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An organic light emitting diode (OLED) display driver integrated circuit, comprising:

a timing control circuit, configured to receive an external vertical synchronization signal, generate an internal vertical synchronization signal, and generate a first switching signal and a second switching signal according to the internal vertical synchronization signal, wherein the timing control circuit determines whether to adjust a time point of a next pulse of the internal vertical synchronization signal according to a time point of the latest received pulse of the external vertical synchronization signal, wherein the first switching signal and the second switching signal are output to an OLED display panel and utilized for controlling an emission control circuit disposed in the OLED display panel which is utilized for controlling an illuminating period of pixel units of the OLED display panel.

2. The OLED display driver integrated circuit according to claim 1, wherein the timing control circuit comprises:

a counter, configured to count the number of lines between the latest pulse of the internal vertical synchronization signal and the latest received pulse of the external vertical synchronization signal to generate a count value;

a determination circuit, coupled to the counter, and configured to divide the count value by a clock duty and determine whether the count value is divisible by the clock duty, wherein the clock duty is represented by a preconfigured number of lines; and a compensation circuit, coupled to the determination circuit, and configured to, in response to that the count value is not divisible by the clock duty, calculate a compensated vertical total line number which is divisible by the clock duty.

3. The OLED display driver integrated circuit according to claim 2, wherein the compensated vertical total line number equals the count value plus a compensation value, and the compensation value equals a remainder of the count value divided by the clock duty.

4. The OLED display driver integrated circuit according to claim 2, wherein the timing control circuit generates the next pulse of the internal vertical synchronization signal when a time period determined by the compensated vertical total line number elapses from the timing point of the latest pulse of the internal vertical synchronization signal.

5. The OLED display driver integrated circuit according to claim 1, wherein in response to determining to adjust the time point of the next pulse of the internal vertical synchronization signal, the timing control circuit generates the next pulse of the internal vertical synchronization signal when a time period determined by a compensated vertical total line number elapses from the timing point of the latest pulse of the internal vertical synchronization signal, wherein the compensated vertical total line number is an integer multiple of a clock duty.

6. The OLED display driver integrated circuit according to claim 1, wherein in response to determining not to adjust the time point of the next pulse of the internal vertical synchronization signal, the timing control circuit generates the next pulse of the internal vertical synchronization signal when a time period determined by an original vertical total line number elapses from the timing point of the latest pulse of the internal vertical synchronization signal.

7. The OLED display driver integrated circuit according to claim 1, wherein the emission control circuit comprises:

a pull-up control circuit, coupled to the OLED display driver integrated circuit, and configured to receive the first switching signal;

a pull-down control circuit, coupled to the OLED display driver integrated circuit, and configured to receive the second switching signal;

a pull-up transistor, coupled to the pull-up control circuit and an output node; and a pull-down transistor, coupled to the pull-down control circuit and the output node, wherein the output node is further coupled to the pixel unit, and configured to output the emission signal to the pixel unit.

8. A display driving method for an organic light emitting diode (OLED) display driver integrated circuit, comprising:

receiving an external vertical synchronization signal and generating an internal vertical synchronization signal by a timing control circuit in the OLED display driver integrated circuit;

generating a first switching signal and a second switching signal according to the internal vertical synchronization signal by the timing control circuit;

determining whether to adjust a time point of a next pulse of the internal vertical synchronization signal according to a time point of the latest received pulse of the external vertical synchronization signal by the timing control circuit; and outputting the first switching signal and the second switching signal to an OLED display panel to control an emission control circuit disposed in the OLED display panel which is utilized for controlling an illuminating period of pixel units of the OLED display panel.

9. The display driving method according to claim 8, wherein the step of determining whether to adjust the time point of the next pulse of the internal vertical synchronization signal comprises:

counting the number of lines between the latest pulse of the internal vertical synchronization signal and the latest received pulse of the external vertical synchronization signal to generate a count value by a counter;

dividing the count value by a clock duty and determine whether the count value is divisible by the clock duty by a determination circuit, wherein the clock duty is represented by a preconfigured number of lines; and in response to that the count value is not divisible by the clock duty, calculating a compensated vertical total line number which is divisible by the clock duty by a compensation circuit.

10. The display driving method according to claim 9, wherein the time period determined by the compensated vertical total line number equals the count value plus a compensation value, and the compensation value equals the clock duty minus a remainder of the count value divided by the clock duty.

11. The display driving method according to claim 9, further comprising:

generating the next pulse of the internal vertical synchronization signal by the timing control circuit when the time period determined by the compensated vertical total line number elapses from the timing point of the latest pulse of the internal vertical synchronization signal.

12. The display driving method according to claim 8, further comprising:

in response to determining to adjust the time point of the next pulse of the internal vertical synchronization signal, generating the next pulse of the internal vertical synchronization signal by the timing control circuit when a time period determined by a compensated vertical total line number elapses from the timing point of the latest pulse of the internal vertical synchronization signal, wherein the compensated vertical total line number is an integer multiple of a clock duty.

13. The display driving method according to claim 8, further comprising:

in response to determining not to adjust the time point of the next pulse of the internal vertical synchronization signal, generating the next pulse of the internal vertical synchronization signal by the timing control circuit when a time period determined by an original vertical total line number elapses from the timing point of the latest pulse of the internal vertical synchronization signal.

14. The display driving method according to claim 8, wherein the emission control circuit comprises:

a pull-up control circuit, coupled to the OLED display driver integrated circuit, and configured to receive the first switching signal;

a pull-down control circuit, coupled to the OLED display driver integrated circuit, and configured to receive the second switching signal;

a pull-up transistor, coupled to the pull-up control circuit and an output node; and a pull-down transistor, coupled to the pull-down control circuit and the output node, wherein the output node is further coupled to the pixel unit, and configured to output the emission signal to the pixel unit.

* * * * *